(12) United States Patent
Meiners

(10) Patent No.: US 7,762,037 B2
(45) Date of Patent: Jul. 27, 2010

(54) SEGMENT FOR A TOWER OF A WIND ENERGY TURBINE AND METHOD FOR ARRANGING OPERATING COMPONENTS OF A WIND ENERGY TURBINE IN A TOWER THEREOF

(75) Inventor: Karl-Heinz Meiners, Neuenkirchen (DE)

(73) Assignee: General Electric Company, Schenectady, NY (US)

( * ) Notice: Subject to any disclaimer, the term of this patent is extended or adjusted under 35 U.S.C. 154(b) by 1162 days.

(21) Appl. No.: 11/282,187

(22) Filed: Nov. 18, 2005

(65) Prior Publication Data

US 2007/0125037 A1 Jun. 7, 2007

(51) Int. Cl.
*E04H 12/00* (2006.01)
*E04H 5/00* (2006.01)
*E04H 5/08* (2006.01)
*F16M 13/00* (2006.01)

(52) U.S. Cl. .................. 52/651.01; 52/223.3; 52/223.4; 52/651.07; 416/244 R; 248/581; 248/603; 248/637

(58) Field of Classification Search .................. 52/848, 52/302.2, 223.3, 223.4, 651.01, 651.07; 416/244 R; 405/195.1; 248/581, 637, 638, 248/639, 645, 603
See application file for complete search history.

(56) References Cited

U.S. PATENT DOCUMENTS

| 1,220,106 | A | * | 3/1917 | Hartenberger ................ 52/192 |
| 3,378,082 | A | * | 4/1968 | Bear ...................... 416/214 R |
| 4,211,383 | A | * | 7/1980 | Starcevic .................... 248/603 |
| 4,958,960 | A | * | 9/1990 | Turner et al. ............. 405/195.1 |
| 5,398,477 | A | * | 3/1995 | Philipp et al. ................. 52/848 |
| 5,480,265 | A | * | 1/1996 | Marshall et al. ............. 405/224 |
| 5,490,364 | A | * | 2/1996 | Desai et al. .................... 52/637 |
| 5,588,781 | A | * | 12/1996 | Smolinski et al. ......... 405/195.1 |
| 5,642,966 | A | * | 7/1997 | Morrison et al. ......... 405/195.1 |
| 6,116,179 | A | * | 9/2000 | Swinbanks et al. .......... 114/269 |
| 2003/0147753 | A1 | * | 8/2003 | Ollgaard ................. 416/244 A |
| 2005/0166521 | A1 | * | 8/2005 | Silber .......................... 52/633 |
| 2007/0125037 | A1 | * | 6/2007 | Meiners ..................... 52/720.1 |
| 2008/0145232 | A1 | * | 6/2008 | Ollgaard ................. 416/244 A |

(Continued)

FOREIGN PATENT DOCUMENTS

EP 1 381 775 B1 7/2004

(Continued)

OTHER PUBLICATIONS

General Electric Company, European Search Report (5 pgs.), EP Application No. 06124287, Mar. 13, 2007.

(Continued)

*Primary Examiner*—Richard E Chilcot, Jr.
*Assistant Examiner*—Andrew J Triggs
(74) *Attorney, Agent, or Firm*—James McGinness, Esq.; Armstrong Teasdale LLP

(57) ABSTRACT

The segment for a tower of a wind energy turbine comprises a tubular section having a longitudinal axis and inner and outer sides, and at least one group of supporting elements arranged at the inner side of the tubular section. The segment further comprises at least one platform supportable by the supporting elements of the at least one group of supporting elements.

13 Claims, 5 Drawing Sheets

U.S. PATENT DOCUMENTS

2009/0031639 A1* 2/2009 Cortina/Cordero ............. 52/40

FOREIGN PATENT DOCUMENTS

| EP | 1 156 175 | B1 | 10/2004 |
| EP | 1 544 476 | A2 | 6/2005 |
| WO | WO 03/031733 | A1 | 4/2003 |

OTHER PUBLICATIONS

Chinese Patent Office, Translated First Office Action and Text of First Office Action for Application No. 200610171909.9, Dec. 11, 2009, 7 pages.

* cited by examiner

SEGMENT FOR A TOWER OF A WIND ENERGY TURBINE AND METHOD FOR ARRANGING OPERATING COMPONENTS OF A WIND ENERGY TURBINE IN A TOWER THEREOF

BACKGROUND OF THE INVENTION

The present invention relates to the arrangement of operating components or units of a wind energy turbine in the tower thereof. More specifically the present invention relates to a segment for a tower of a wind energy turbine for arranging operating components of the wind energy turbine in the tower. In addition, the present invention also relates to a method for arranging operating components of a wind energy turbine in its tower.

Modern high performance wind energy turbines often comprise a tubular tower, with diverse operating components of the wind energy turbine located internally of the tower and at the bottom thereof. These components or units are e.g. the frequency converter, the transformer and/or control systems which are necessary to supply the electrical energy from the generator to the grid.

Access to the components and units located at the bottom of and within the tower is possible via a tower door located in the wall of the tower. In the past, these components and units were brought into the tower through the tower door. Since the tower door defines a limited opening, the size of the individual units and components or parts thereof had to be limited. In addition, assembling and mounting of operating components of a wind energy turbine in its tower is rather time consuming.

For example, EP-B-1 381 775 discloses a method for erecting the tower of a wind energy turbine in which after the formation of the foundation of the tower, at least one operating component of the wind energy turbine, namely at least one electrical power module, is arranged on the foundation and, thereafter, the lowermost segment of the tower is placed over the premounted module. This procedure requires some attention and effort to prevent damage of the premounted module when lowering the tower segment onto the foundation.

BRIEF DESCRIPTION OF THE INVENTION

The present invention relates to a segment for a tower of a wind energy turbine, comprising a tubular section having a longitudinal axis and inner and outer sides, at least one group of supporting elements arranged at the inner side of the tubular section, and at least one platform supportable by the supporting elements of the at least one group of supporting elements.

According to another aspect of the present invention there is provided a method for arranging operating components of a wind energy turbine in a tower thereof. The method includes the steps of erecting a tower segment, inserting at least one platform into the erected tower segment from above and attaching the at least one platform at an inner side of the tower segment, and arranging at least one operating component on the at least one platform.

In another aspect, the present invention provides a tower segment for a wind energy turbine having inner and outer sides as well as a longitudinal axis. The tubular segment can have a cylindrical or conical shape or any desired other shape. At the inner side of the segment there is provided at least one group of supporting elements for supporting at least one platform which can be inserted into the erected segment from above by lowering the at least one platform towards and into the segment until the platform rests on the supporting elements. Preferably, the segment according to the invention comprises more than one group of supporting elements so that multiple platforms at different heights can be mounted within the segment of the tower.

As an alternative, instead of mounting each platform directly at the inner side of the segment, it is also possible to mount at the at least one group of supporting elements on a rack having several floors on which operating components for the wind energy turbine are located. Also with this concept it is possible to arrange operating components for a wind energy turbine within its tower at different levels.

For inserting and mounting the at least one platform in the erected tower segment, a crane or other external winch can be used. If after complete erection of the whole wind energy turbine one of the operating components or units arranged in the tower has to be disassembled for replacement purposes or the like, the winch normally arranged in the nacelle at the top of the tower can be used for transportation and lifting purposes. If more than one platform is mounted in the tower segment, replacement of an operating component located on a middle or lower platform can be performed by transporting the component or unit through openings in the platform or platforms arranged above the respective platform where the unit or component to be replaced is located for safety reasons, the openings in the platforms can be closed by removable lids or the like covers.

DETAILED DESCRIPTION OF THE INVENTION

While the invention has been described in terms of various specific embodiments, those skilled in the art will recognize that the invention can be practiced with modification within the spirit and scope of the claims.

Figure 1:
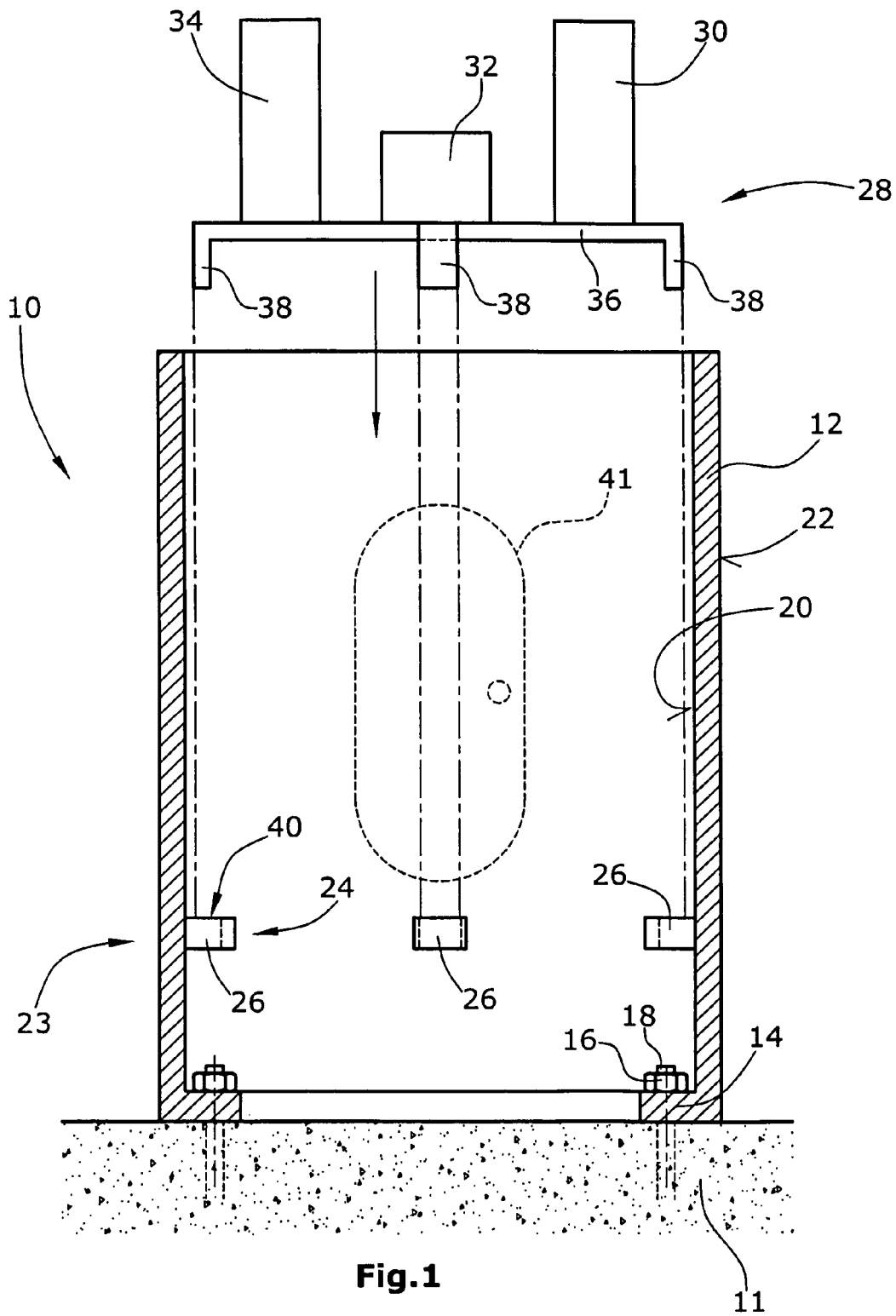
FIG. 1 shows a cross sectional view through an erected lowermost tower module for a wind energy turbine with supporting elements at its inner side for supporting a platform carrying diverse operating components of the wind energy turbine, which platform can be inserted from above into the tower segment until resting on the supporting elements of the tower segment.

FIG. 1 depicts a tower segment 10 according to a first embodiment of the invention for the tower of a wind energy turbine (both not shown) erected and supported on a foundation 11. Tower segment 10 includes a tubular section 12 having an inner flange 14 mounted e.g. by means of screws 16 to anchoring elements 18 embedded in foundation 11. Tubular section 12 is of a cylindrical shape and includes a cylindrical inner side 20 and cylindrical outer side 22. At inner side 20 of tubular section 12 which e.g. can be made from a metal such as steel or the like, there are arranged a group 23 of supporting elements 24 in the form of a substantially U-shaped bracket 26. In the embodiment illustrated in FIG. 1, these supporting elements 24 are arranged substantially at the same height or level above flange 14. A platform 28 can rest and be attached to supporting elements 24. As shown in FIG. 1, this platform 28 is inserted into tubular section 12 by lowering platform 28 using a crane or the like winch after tower segment 10 is erected and connected to foundation 11. Platform 28 is used for supporting diverse operating components or units for the wind energy turbine, such as a frequency converter 30, a transformer 32 and/or a controller 34 which are utilized to supply the electrical power from the generator to the grid. Platform 28 includes a plate 36 and projecting elements 38 extending away from the lower side of plate 36 and arranged so as to enter into space 40 between bracket 26 and inner side 20 of tubular section 12. This relative arrangement of platform 28 and supporting elements 24 is indicated in FIG. 1 by the dotted lines. Moreover, a tower door is by dotted line 41 in FIG. 1.

The construction and design of tower segment 10 as shown in FIG. 1 and provided according to the invention is advantageous in so far as mounting a preassembled operating component unit, e.g. an electrical power module, is possible after erection of tower segment 10, which reduces the risk of damages to the operating component unit when mounting the same in the tower.

It is to be noted here that the specific configuration and shape of engaging supporting element 24 and projecting elements 38 as shown in FIG. 1 are not necessary according to the invention. The invention merely utilizes the provision of some kind of bearing surface or the like supporting surface at inner side 20 of tower segment 10 for carrying a platform or the like supporting structure supporting in turn operating components of the wind energy turbine. Also it is noted that the tower segment carrying the platform or at least one platform with operating components for the wind energy turbine can be other than the lowermost segment of the tower. Basically, each segment of the tower can be used as the tower segment for supporting at its inner side some operating components of the wind energy turbine. However, for these purposes, normally one will use the lowermost or one of the lowermost tower segments.

Figure 2:
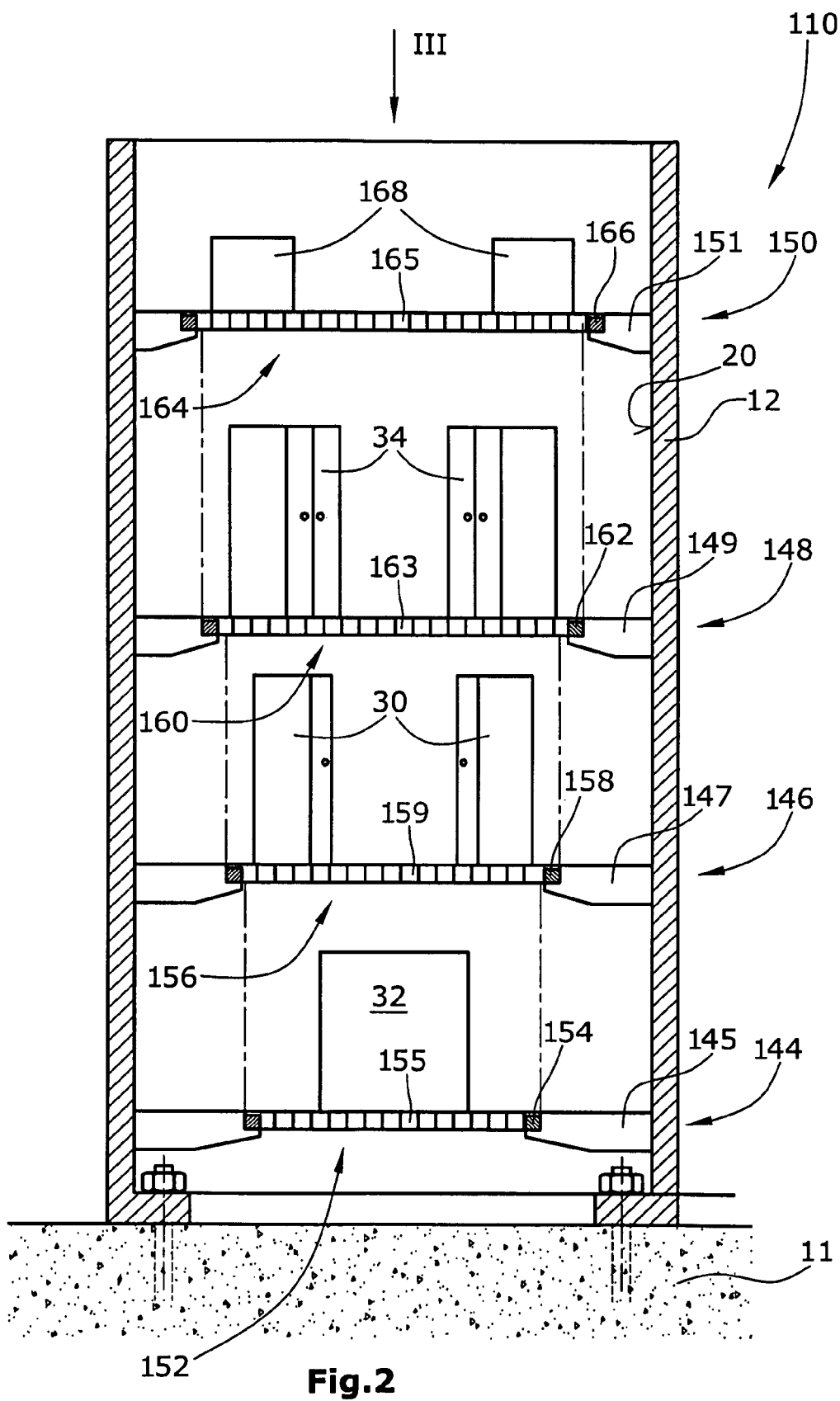
FIG. 2 shows a cross sectional view through another tower segment having more than one platform resting on supporting elements projecting from the inner side of the tower segment and at different heights.
Figure 3:
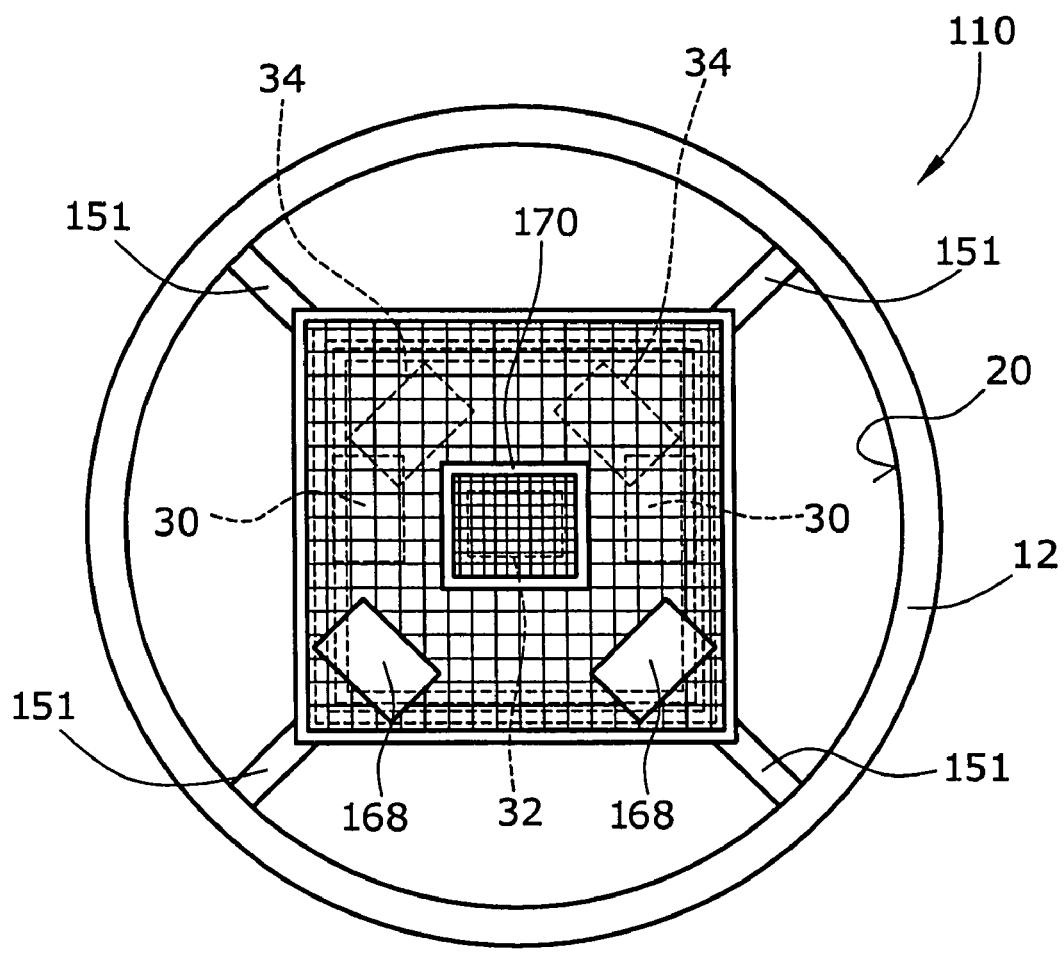
FIG. 3 is a view from above onto the erected tower segment as shown in FIG. 2.

FIGS. 2 and 3 show another embodiment of a tower segment 110 for the tower of a wind energy turbine which tower segment 110 also supports diverse operating components of the wind energy turbine located on several platforms arranged at different heights within tower segment 110. As far as the elements shown in FIG. 2 are identical or similar to the elements shown in FIG. 1, the same reference numerals are used in FIGS. 2 and 3.

Tower segment 110 of FIGS. 2 and 3 includes a cylindrical tubular section 12 having a plurality of groups 144, 146, 148, 150 of supporting elements 145, 147, 149, 151 all of which are projecting from inner side 20 of tubular section 12. Supporting elements 145 of the lowermost group 144 of the supporting elements extend the longest distance from the wall of tubular section 12, while this distance decreases the higher groups 146, 148, 150 of supporting elements 147, 149, 151 are arranged within tubular section 12. In this embodiment, supporting elements 145, 147, 149, 151 are provided as supporting beams or arms having individual platforms 152, 156, 160, 164 resting thereon. Each platform includes an outer frame 154, 158, 162, 166 resting on supporting elements 145, 147, 149, 151 of the respective group 144, 146, 148, 150 of supporting elements, and further includes a removable plate or the like cover element 155, 159, 163, 165 inserted in the respective frame 154, 158, 162, 166 and resting thereon. The diverse operating components such as transformer 32, controllers 34, frequency converters 142, and other units 168 are located and arranged on the individual platforms 152, 156, 160, 164, as shown in FIGS. 2 and 3. The arrangement of these components as shown in FIGS. 2 and 3 is advantageous in that although all the components and units are mounted on their respective platforms and all the platforms are mounted into tower segment 110, there is still one channel area extending through all the platforms. This area is free of the components so that it can be used for lifting and lowering individual operating components for replacement purposes or the like. Accordingly, there is no need to remove other components prior to the replacement and transportation of a component to be replaced. According to FIGS. 2 and 3 this free-of-components area is arranged in the center of the tower wherein plates 159, 163, 165 are formed with an opening (see 170 in FIG. 3), with all of these openings 170 being in alignment with each other. It is possible that the area free of components can also be arranged eccentrically and, e.g., close to inner side 20 of tubular section 12. For safety reasons, openings 170 should be closed by removable lids or similar covers. Moreover, a climbing ladder can be arranged at inner side 20 of tubular section 12 for climbing up from platform to platform for the maintenance personal. This climbing ladder is not shown in FIGS. 2 and 3. Also not shown in these Figures are covering elements covering the space between the individual platforms and inner side 20 of tubular section 12. Also these covering elements are provided for safety reasons and in order to have more storage area per platform level.

Assembling tower segment 110 according to FIG. 2 is performed by first erecting tower segment 110 and mounting it to foundation 11. Thereafter, lowermost platform 152 is inserted by lowering it from above into tower segment 110, passing the three uppermost groups 146, 148, 150 of supporting elements until lowermost platform 152 rests on its associated supporting elements 145 of lowermost group 144 of the supporting elements. Thereafter, second lowermost platform 156 is assembled with the same procedure being repeated for the remaining platforms 160 and 164. All of the platforms which are inserted in tower segment 110 can already be provided with the respective premounted components as shown in FIG. 2.

Figure 4:
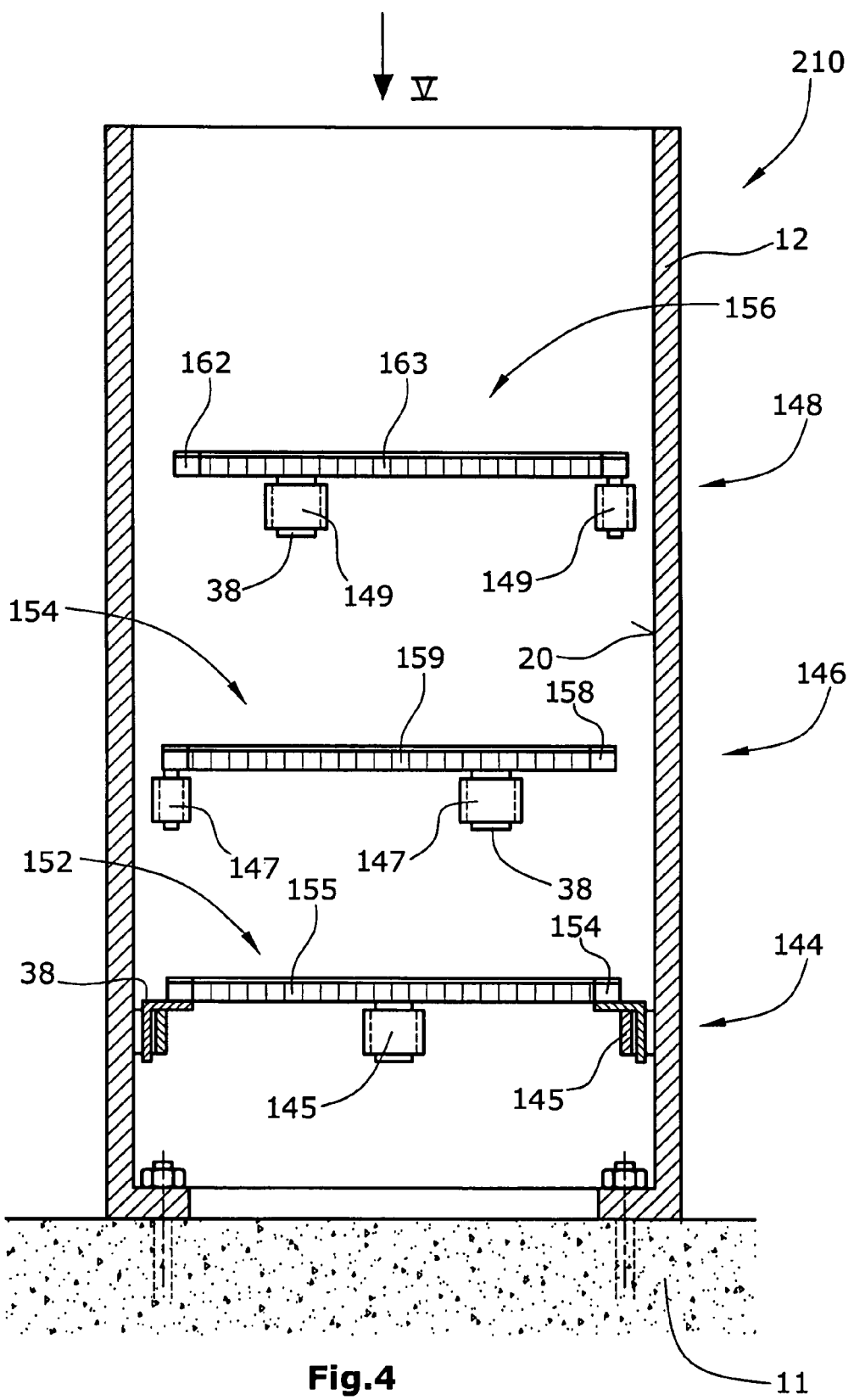
FIG. 4 is a cross sectional view through a further tower segment having multiple groups of supporting elements offset with respect to each other in a circumferential direction for supporting multiple platforms.
Figure 5:
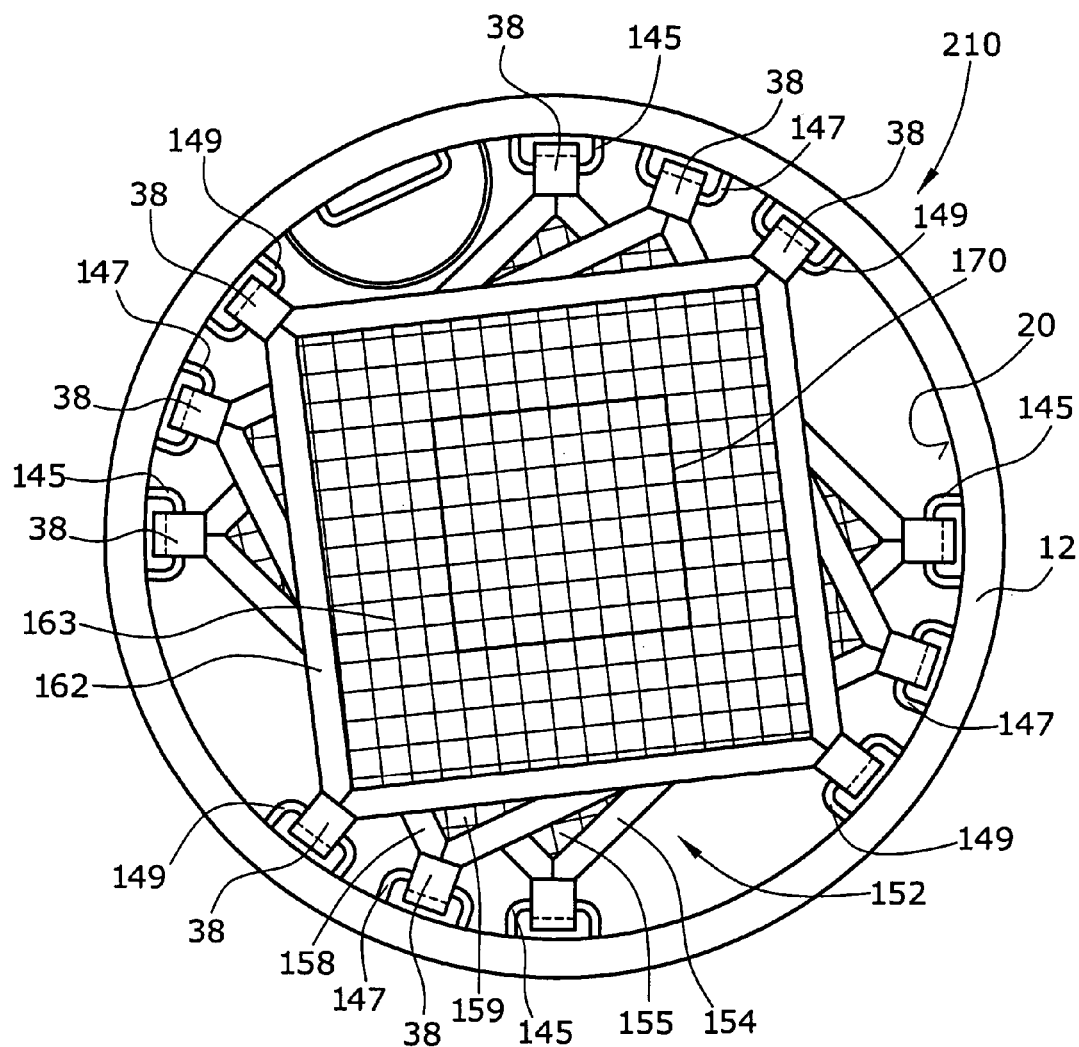
FIG. 5 is a plan view onto the erected tower segment according to FIG. 4 with the platforms arranged therein.

FIGS. 4 and 5 depict a further embodiment of a tower segment 210 according to another aspect of the invention. It is to be noted that in FIGS. 4 and 5, elements and components identical or similar to those shown in FIGS. 1 to 3, are provided with the same reference numerals.

Similar the embodiment according to FIGS. 2 and 3, in the embodiment of tower segment 210 of FIGS. 4 and 5, several platforms 152, 156, 160 are provided (see FIG. 5). Individual platforms 152, 156, 160 are mounted at inner side 20 of tubular section 12 of tower segment 210 by means of bracket-like supporting elements 145, 147, 149 arranged in groups 144, 146, 148 at different heights above the lower end of tubular section 12. The specific feature of tower segment 210 of FIGS. 4 and 5 relates to the relative arrangement of the supporting elements 145, 147, 149. Namely, as can be seen in particular in FIG. 5, supporting elements 145, 147, 149 of all the groups 144, 146, 148 of supporting elements are off set relative to each other in a circumferential direction so that, when viewed along the longitudinal axis of tubular section 12 the supporting elements 145, 147, 149 of the individual groups 144, 146, 148 of supporting elements do not overlap each other. This is advantageous in that each platform, after being aligned with the supporting elements of the associated group of supporting elements can be lowered into tower segment 210 without interfering with the supporting element of the respective other groups of supporting elements. Also the shape and overall design of all the platforms 152, 154, 156 can be the same in the embodiment of FIGS. 4 and 5.

The remaining elements of tower segment 210 shown in FIGS. 4 and 5 can be the same as in case of the tower segment 10 and 110 shown in FIGS. 1 to 3.

What is claimed is:

1. A segment for a tower of a wind energy turbine, comprising:

a tubular section having a longitudinal axis and inner and outer sides;

at least two groups of supporting elements arranged at said inner side of said tubular section; and at least two platforms, each of said platforms supportable by a respective one of said groups of supporting elements, said at least two platforms comprising an upper platform and a lower platform, wherein each of said platforms comprises an outer frame that defines an opening that is closeable by a removable insert configured to rest on said outer frame, said outer frame and the opening of said lower platform sized smaller than said outer frame and the opening of said upper platform such that said outer frame of said lower platform is configured to pass through the opening of said upper platform.

2. The segment according to claim 1 wherein said groups of supporting elements are arranged at respective different heights with respect to the longitudinal axis of said tubular section.

3. The segment according to claim 2 wherein said supporting elements of a respective group are offset in a circumferential direction of said tubular section with respect to said supporting elements of an adjacent group.

4. The segment according to claim 2 wherein a projection of each of said groups of supporting elements from said inner side decreases from group to group in an upward direction along the longitudinal axis.

5. The segment according to claim 1 wherein said tubular section is cylindrical.

6. A segment for a tower of a wind energy turbine, comprising:

a tubular section having a longitudinal axis and inner and outer sides;

at least two groups of supporting elements arranged at said inner side of said tubular section; and at least two platforms, each of said platforms supportable by a respective one of said groups of supporting elements, said at least two platforms comprising an upper platform and a lower platform sized smaller than said upper platform.

7. The segment according to claim 6 wherein said groups of supporting elements are arranged at respective different heights with respect to the longitudinal axis of said tubular section.

8. The segment according to claim 7 wherein said supporting elements of a respective group are offset in a circumferential direction of said tubular section with respect to said supporting elements of an adjacent group.

9. The segment according to claim 7 wherein a projection of each of said groups of supporting elements from said inner side decreases from group to group in an upward direction along the longitudinal axis.

10. The segment according to claim 6 wherein each of said platforms comprises an outer frame that defines an opening that is closeable by a removable insert configured to rest on said outer frame, said outer frame and the opening of said lower platform sized smaller than said outer frame and the opening of said upper platform such that said outer frame of said lower platform is configured to pass through the opening of said upper platform.

11. The segment according to claim 10 wherein said lower platform comprises at least one electrical component coupled to said lower platform such that said lower platform is configured to pass through the opening of said upper platform with said at least one electrical component coupled to said lower platform.

12. The segment according to claim 6 wherein said tubular section is cylindrical.

13. The segment according to claim 6 wherein the tower is erected from a foundation, said tubular section configured to be mounted on the foundation such that at least one electrical component is supported above the foundation by at least one of said lower platform and said upper platform, wherein no electrical components are mounted on the foundation.

* * * * *